A. SUNDH.
CLUTCH.
APPLICATION FILED APR. 30, 1917.
1,372,986.
Patented Mar. 29, 1921.
2 SHEETS—SHEET 2.
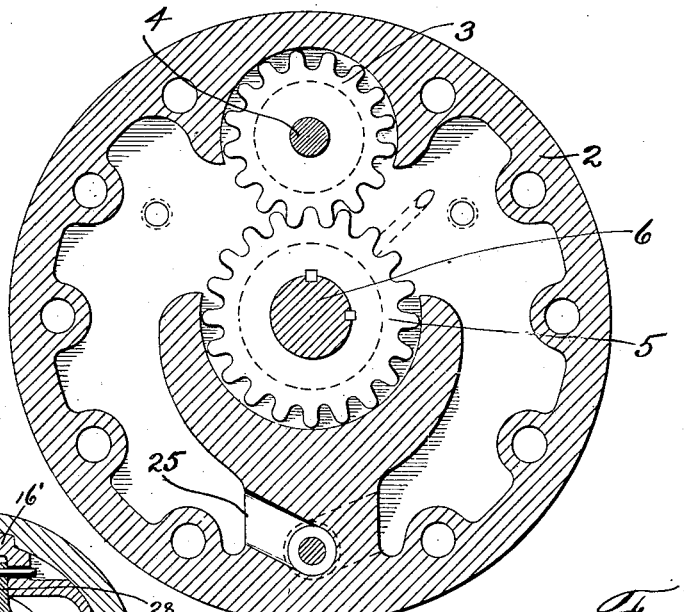
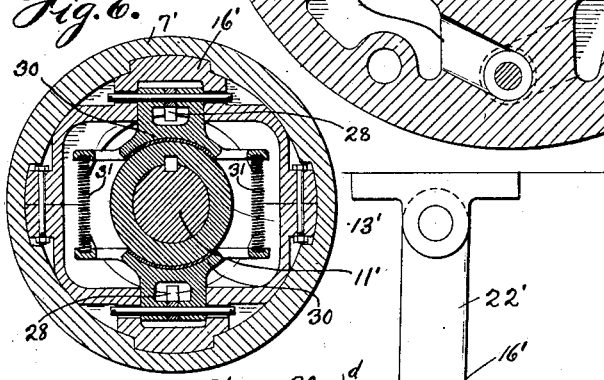
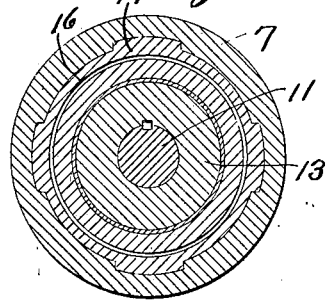
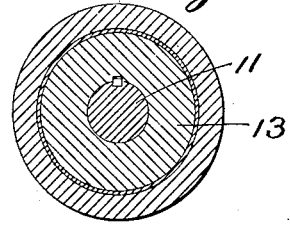
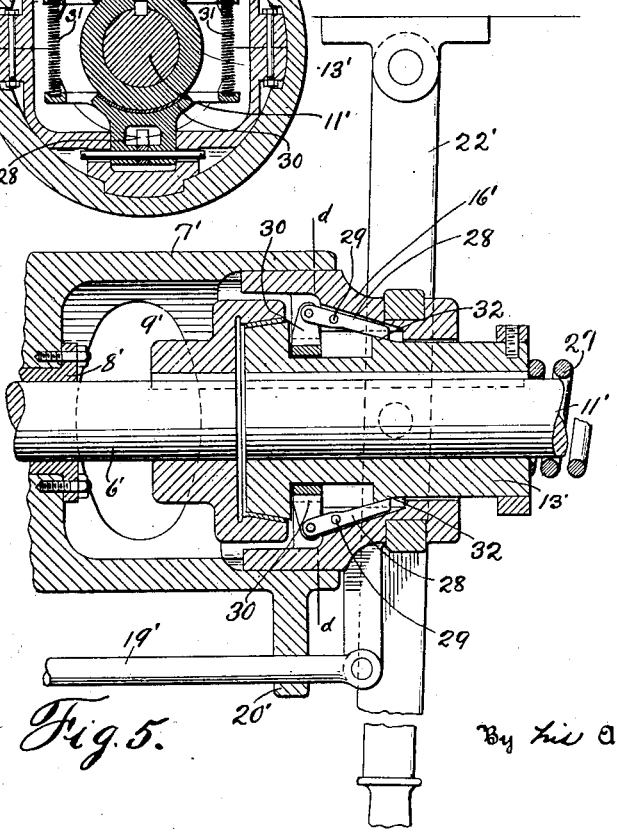
Inventor
August Sundh.
By his Attorney
James G. Bethell.

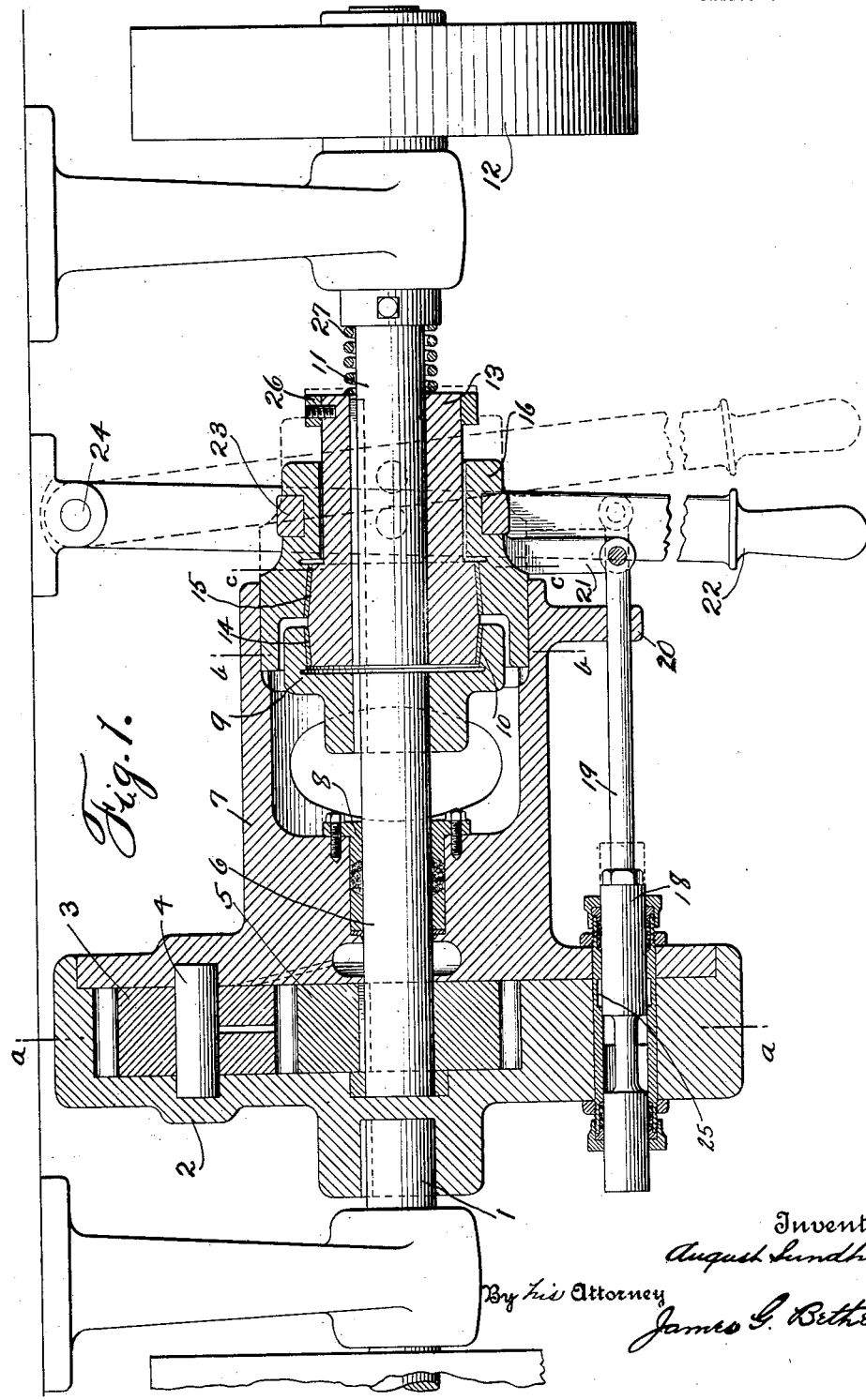

UNITED STATES PATENT OFFICE.

AUGUST SUNDH, OF HASTINGS-UPON-HUDSON, NEW YORK.

CLUTCH.

1,372,986.  Specification of Letters Patent. Patented Mar. 29, 1921.

Application filed April 30, 1917. Serial No. 165,480.

*To all whom it may concern:*

Be it known that I, August Sundh, a citizen of the United States, residing in Hastings-upon-Hudson, in the county of Westchester and State of New York, have invented a new and useful Improvement in Clutches, of which the following is a specification.

My invention relates to an improvement in clutch mechanism, and it is an object of my invention to obtain smooth starting and stopping when the clutch mechanism is thrown in or out, and also to obtain a variable intermediate speed.

In the embodiment of my invention, I employ a fluid clutch and a friction clutch for connecting and positively disconnecting the clutch mechanism, and I also employ a third clutch for making a direct connection around the fluid clutch.

Fluid clutches as now constructed cannot be entirely disconnected, and therefore the fluid in the clutch will be circulated all the time. This means low efficiency, heating of the fluid, and a possible setting in motion of the apparatus, which is supposed to be at rest, due to the constant circulation of the fluid. There is more or less slippage with fluid clutches as now constructed when running at full speed due to leakage of the fluid.

With my improved clutch, I can make use of a fluid clutch and obtain the best result from the same, since I positively disconnect the clutch mechanism when I want the driven apparatus to be held at rest; and when I desire to drive it at full speed, I make a direct connection around the fluid clutch. In this way I avoid the danger mentioned above and also avoid a great deal of slippage when running at maximum speed.

In the present invention, I have provided a single controlling lever, which is operated at will to cause the driven mechanism to run at any desired speed relatively to the driving means. By manipulation of this controlling lever I first allow a friction clutch to operate, and by a further manipulation of the controlling lever I throttle the fluid in the fluid clutch to cause the driven mechanism to run at a speed relatively to the driving mechanism depending upon the extent to which the fluid is throttled by movement of the controlling lever. The apparatus is so constructed that the driven mechanism can be brought up to maximum speed by merely moving the controlling lever until the fluid in the fluid clutch is locked therein. A still further movement of the controlling lever will bring into action a third clutch member which is a friction clutch, and with this last named clutch in operative position I drive the driven mechanism directly around the fluid clutch, and in this way divide the work of the clutch between the clutch last mentioned and the fluid clutch.

In the accompanying drawings showing an embodiment of my invention, Figure 1 is a part sectional elevation view; Fig. 2 is a section on the line $a$—$a$ of Fig. 1; Fig. 3 is a section on the line $b$—$b$ of Fig. 1; Fig. 4 is a section on the line $c$—$c$ of Fig. 1; Fig. 5 is a sectional elevation of a modification; and Fig. 6 is a section taken approximately on the line $d$—$d$ of Fig. 5.

Like characters of reference designate like parts throughout all the various figures of the drawings.

Referring to the drawings in detail, 1 designates a shaft which may be driven by any suitable motor, this shaft being keyed to a casing 2. A spur gear 3 is carried within the casing 2 and mounted for rotation therein on the stud 4. This gear engages a similar gear 5, within the casing 2, keyed to a shaft 6. A member 7 is secured to the casing 2 and rotates therewith. The shaft 6 has a bearing in the casing 2 and the member 7 passing through the stuffing box 8 of the latter. Keyed to the extreme right hand end of the shaft 6, as viewed in Fig. 1, is a clutch member 9 having an inclined face 10. A shaft 11, in alinement with the shaft 6, is connected to the driven mechanism here shown as a pulley 12. The shaft 11 carries a clutch member 13 having two inclined faces 14 and 15, the inclined face 14 being adapted to engage the inclined portion 10 of the clutch member 9 at a certain time, as will be hereinafter fully pointed out. The clutch member 13 is keyed to the shaft 11 so as to be free to slide longitudinally thereof. Surrounding the clutch member 13 is another clutch member 16, this member being provided with laterally extending portions 17, which engage corresponding grooves in the member 7 secured to the casing 2, so that when the casing 2 is rotating, the clutch member 16 will also rotate at the same speed. This clutch member has an inclined portion adapted to engage at a certain time the inclined face 15 of the clutch member 13.

The valve for controlling the fluid within the casing 2 comprises a piston 18 adapted for movement in the casing 2. A valve stem 19 attached to the piston 18 and having a bearing in a lateral projection 20 formed on the member 7, is connected to the clutch member 16 by a link 21. A controlling lever 22 is secured to the clutch member 16 by means of a ring 23 so that the clutch member 16 may rotate without carrying with it the lever 22. The lever 22 is pivoted at 24, and in the actual construction of my clutch mechanism some means will be carried by the lever to hold it in adjusted position.

The operation of my device will now be described.

In the position shown in Fig. 1, the parts are in position so that the valve piston 18 has closed off the by-pass 25 within the casing 2, locking the fluid within the casing, and the whole clutch mechanism together with the pulley 12, will be rotated at whatever speed the motor driving the shaft 1 may be running at. At this time it will be seen that the clutch member 13 is moved to its extreme left hand position to engage the clutch member 9, and the clutch member 16 is also moved to its extreme left hand position to engage the clutch member 13, and inasmuch as the clutch member 13 is keyed to the shaft 11, the latter will be driven both through the fluid locked within the casing 2, and through the casing 2, member 7, and clutch members 16 and 13. In other words, at this time, which is full speed, I have divided my driving force between the fluid clutch and the clutch members 13 and 16. The operator may now move the lever 22 to the right carrying with it the clutch member 16, and also opening up the bypass 25 by the connection of the member 16 to the valve piston 18. This movement of the lever 22 will cause the clutch member 16 to be moved out of engagement with the clutch member 13, and inasmuch as the valve piston has partially opened the bypass port 25, the shaft 11, and therefore the pulley 12 will now rotate at a slower speed than the shaft 1. This manipulation of the lever 22 may be continued until the valve piston 18 has fully uncovered the port 25, at which time of course the speed of the shaft 11 will be very much reduced owing to all the fluid circulated within the casing 2 being bypassed. When this point has been reached, the clutch member 16 will engage a collar 26 carried on the extreme right hand end of the clutch 13, and any further movement of the clutch member 16, under the action of the lever 22, will move the clutch member 13 to the right to cause this clutch member to be free from the clutch member 9. This movement of the clutch member 13 compresses a spring 27 carried on the shaft 11. With this position of the clutch members there is no driving action on the shaft 11. When it is desired to put the clutch into operation again, the lever 22 is moved from its dotted line position to the left, and the clutch member 13, under the action of the spring 27, will be moved into engagement with the clutch member 9, and further movement of the lever 22 will cause the valve piston 18 to close off the bypass 25 to an extent depending upon the speed at which it is desired to drive the shaft 11. If the lever 22 be moved still further to the left, it will gradually close off the bypass port 25 until the port is completely closed off and the fluid within the casing 2 locked therein, at which time the shaft 11 will be driven at the same speed as the casing 2 or the shaft 1. The lever 22 may then be moved to its extreme left hand position, at which time the clutch member 16 will engage the clutch member 13 at the inclined face 15 of the latter to establish a driving connection between the shaft 1 and the shaft 11, through the casing 2 and clutch member 7 around the fluid clutch within the casing 2. As there may be some leakage of fluid in the fluid clutch which would allow the pressure therein to drop with the clutch mechanism in position to drive the shaft 11 at maximum speed, it is desirable that the clutch member 16 be allowed to slip on the clutch member 13 so as to maintain the pressure in the fluid clutch up to the maximum, for, were this slippage not provided the fluid leaking in the fluid clutch would allow the pressure therein to drop, and practically all the driving action on the shaft 11 would be by way of the clutch members 7, 13 and 16, and under such conditions it would be very difficult to move the lever 22 to a position to slow down the shaft 11; and even were it possible to move the lever 22, at the time the clutch member 16 is moved out of engagement with the clutch member 13, the pressure in the fluid clutch being low there might be a sudden shock to the shaft 11 and whatever mechanism it is connected with to drive, which would be impracticable.

The apparatus illustrated in Figs. 5 and 6 is a modification of the clutch already described, the fluid clutch being the same as that shown in Fig. 1. In this apparatus a shaft 6' corresponds to the shaft 6 of Fig. 1, this shaft passing through a stuffing box 8' and into a casing (not shown) containing a fluid clutch similar to that already described. This shaft 6' carries a clutch member 9' similar to the clutch member 9 of Fig. 1. A clutch member 7' is provided similar to the member 7 of Fig. 1, this member having a lateral projection 20' forming a bearing for a valve stem 19', which corresponds to the valve stem 19 of Fig. 1. A lever 22' is provided for operating a clutch member 16' engaging the clutch member 7', as illustrated in Fig. 6. The clutch member 13' is keyed on shaft 11' so as to slide longitudinally thereof, which may be connected to a mechanism which it is desired to drive. Carried by the clutch member 16' is a pair of levers 28 pivoted thereto at 29. Pivotally attached to the levers 28 are a pair of clutch members 30 adapted to engage the clutch member 13', but normally held out of engagement therewith by springs 31. The ends of the levers 28 with the clutching mechanism disconnected are adapted to engage the straight portion of the clutch member 13', the clutch members 30 being held off under the action of the springs 31, already mentioned; but with the lever 22' moved to its extreme left hand position to cause the shaft 11' to be driven at full speed, the ends of the levers 28 will be forced to ride up an inclined portion 32 formed on the clutch 13' to cause the levers to be rotated on their pivots 29 to force the clutch members 30 into engagement with the clutch member 13'. The parts are shown in this position in Fig. 5. A spring 27' is provided on the shaft 11' corresponding in function to the spring 27 of Fig. 1. The operation of the device of Figs. 5 and 6 is the same as that of the form shown in Fig. 1 and already described.

It will be seen from the foregoing description that I have provided a clutch by which two members may be clutched together to be driven at the same speed, or at different speeds relatively to each other as desired, which clutch mechanism is controlled by a single controlling lever, and in which, with the two members running at the same speed, the work which the clutch is called upon to perform is divided between a fluid clutch and a friction clutch, which latter is adapted to make a direct connection around the fluid clutch between the driving element and the driven element. It will also be seen that no difficulty will be experienced in operating the controlling lever to vary the speed of the driven element as desired; and also by reason of the fact that I contemplate allowing a slippage in the clutch members by which the driving element and the driven element are connected together around the fluid clutch, which slippage is sufficient to take care of leakage in the fluid clutch, at no time will all the load be transmitted through this particular clutch mechanism, and therefore there will be no unpleasant or disastrous shock to the driven mechanism when the clutch is operated to slow down the driven mechanism.

I desire not to be limited to the precise details of construction herein disclosed and described for the reason that others skilled in this art may make various changes therein without departing from the spirit and scope of my invention.

What I claim as new and desire to secure by Letters Patent of the United States is:

1. A driving member and a driven member, a fluid clutch connected to one of said members, a second clutch for connecting the other member with said fluid clutch, the fluid in the fluid clutch transmitting the power from the driving member to the driven member through said second clutch, and a third clutch for transmitting the power from the driving member to the driven member, independently of said second clutch.

2. A driving member and a driven member, a fluid clutch connected to one of said members, means for connecting and disconnecting the other member with said fluid clutch, the fluid in the fluid clutch transmitting the power from the driving member to the driven member through said connecting and disconnecting means, and additional means for transmitting power from the driving member to the driven member, independently of said first mentioned means.

3. A driving member and a driven member, a clutch mechanism interposed between said members and comprising a fluid clutch, a second clutch for completing the connection between the driving member and the driven member through said fluid clutch, a third clutch for coupling the driving member and the driven member together independently of said second clutch, and a single controlling device for the various clutches.

4. In clutch mechanism, a driving member and a driven member, a fluid clutch interposed between said members, a second clutch for connecting the two members through said fluid clutch, an additional clutch for transmitting power from the driving member to the driven member independent of the second clutch, the several clutches being adapted to transmit power from the driving member to the driven member simultaneously.

5. In clutch mechanism, a driving member and a driven member, a fluid clutch interposed between said members, a second clutch for connecting the two members through said fluid clutch, a friction clutch for transmitting power from the driving member to the driven member independently of the second clutch, the transmission of power from the driving member to the driven member being, substantially, evenly distributed between the fluid clutch and the friction clutch.

6. In clutch mechanism, a driving member and a driven member, a fluid clutch interposed between said members, a second clutch for connecting the two members through said fluid clutch, an additional clutch member adapted to be constantly driven by the driving member and adapted to transmit power from the driving member to the driven member independently of the second clutch.

7. In clutch mechanism, a driving member and a driven member, a fluid clutch interposed between said members, a clutch member carried by the driven member, means for securing said clutch member to the fluid clutch to connect the driving and driven members through the fluid clutch, and a friction clutch adapted to engage the said clutch member carried by the driven member to transmit power from the driving to the driven member independently of the fluid clutch.

8. In clutch mechanism, a driving member and a driven member, a fluid clutch interposed between said members, a clutch member carried by the driven member, means for securing said clutch member to the fluid clutch to connect the driving and driven members through the fluid clutch and a friction clutch having movement relative to said fluid clutch and adapted to engage the said clutch member carried by the driven member to transmit power from the driving to the driven member independently of the fluid clutch.

9. In a clutch mechanism, a driving member and a driven member, a casing driven by the driving member, a fluid clutch therein, an additional clutch for connecting the driving and driven members through said fluid clutch, a clutch member carried by said casing and adapted to transmit power from the driving member to the driven member independently of the fluid clutch, and means for controlling the clutches to cause power to be transmitted from the driving member to the driven member through the fluid clutch and the additional clutch, or through the clutch member carried by said casing only.

10. In clutch mechanism, a driving member and a driven member, a fluid clutch interposed between said members, a second clutch mechanism for connecting the two members through said fluid clutch, additional clutch mechanism for transmitting power from the driving to the driven member independently of said second clutch, and means for actuating said additional clutch mechanism independently of the second named clutch mechanism in reducing the speed of the driven member, and to actuate both clutches together to positively disconnect the driving and driven members.

11. In clutch mechanism, a driving member and a driven member, a casing connected to the driving member, a fluid clutch therein, a shaft extending therethrough, a clutch member carried by said shaft, a clutch member carried by the driven member, means for actuating said last named clutch member longitudinally of the driven member to connect the two members through the fluid clutch, and a valve mechanism for controlling the fluid in the fluid clutch to cause the two members to run at any desired speed relatively to each other.

12. In clutch mechanism, a driving member and a driven member, a casing connected to the driving member, a fluid clutch therein, a shaft carried by said casing, a clutch member carried thereby, a clutch member carried by the driven member and adapted to connect the two members through the fluid clutch and the clutch member carried by said shaft, a spring for actuating the clutch member carried by the driven member, a clutch member connected to said casing and adapted to transmit power from the driving to the driven member independently of the fluid clutch, valve mechanism for controlling the fluid within the fluid clutch, and means for simultaneously operating the clutch member connected to the casing and the valve mechanism.

13. In a clutch mechanism, the combination of a driving and a driven member, a fluid clutch interposed between said members, a second clutch for connecting the two members through said fluid clutch, and a friction clutch for transmitting power from the driving member to the driven member independently of the second clutch.

14. In a clutch mechanism, the combination of a driving member and a driven member, a fluid clutch connected to one of said members, a friction clutch, means for releasably connecting said friction clutch to the other of said members, and means for transmitting the motion of said driving member to said driven member independently of said first mentioned means.

15. In a clutch mechanism, the combination of a driving member and a driven member, a fluid clutch interposed between said driving and driven members, said fluid clutch being connected to one of said members, frictional means adapted to connect said fluid clutch to the other of said members, and other frictional means for transmitting the motion of the driving member to the driven member independently of said first mentioned frictional means.

16. In a fluid clutch, the combination of a driving member and a driven member, a fluid clutch interposed between said members and positively connected to one of said members, and means for releasably connecting said fluid clutch to the other of said members.

In testimony whereof, I have signed my name to this specification.

AUGUST SUNDH.